(12) United States Patent
Rock et al.

(10) Patent No.: US 6,358,638 B1
(45) Date of Patent: Mar. 19, 2002

(54) COLD START-UP OF A PEM FUEL CELL

(75) Inventors: Jeffrey Allan Rock, Rochester, NY (US); Lawrence Bruce Plant, Milford, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/546,404

(22) Filed: Apr. 10, 2000

Related U.S. Application Data

(63) Continuation-in-part of application No. 09/470,366, filed on Dec. 22, 1999, now abandoned.

(51) Int. Cl.$^7$ .............................. H01M 8/00; H01M 8/04
(52) U.S. Cl. .............................. 429/13; 429/12; 429/20; 429/17; 429/24; 429/26; 429/120; 429/30; 429/34; 429/40
(58) Field of Search ............................. 429/13, 12, 17, 429/20, 24, 30, 40, 26, 34, 120

(56) References Cited

U.S. PATENT DOCUMENTS 4,910,099 A  3/1990  Gottesfeld .................. 429/13
6,103,410 A  * 8/2000  Fuller et al. .................. 429/13
6,127,056 A  * 10/2000  Wheeler et al. .............. 429/13

FOREIGN PATENT DOCUMENTS

| DE | 4033286 A1 | 2/1991 | |
|---|---|---|---|
| EP | 63225477 | * 9/1988 | ............ H01M/8/04 |
| EP | 63236262 | * 10/1988 | ............ H01M/4/86 |
| JP | 61158672 | 7/1986 | |
| JP | 63225477 | 9/1988 | |
| JP | 63236262 | 10/1988 | |
| JP | 04106877 | 4/1992 | |
| WO | WO 00/54356 | * 9/2000 | ............ H01M/8/04 |

* cited by examiner

Primary Examiner—Stephen Kalafut
Assistant Examiner—Angela J. Martin
(74) Attorney, Agent, or Firm—Lawrence B. Plant; Cary W. Brooks

(57) ABSTRACT

A method of heating a cold MEA to accelerate cold start-up of a PEM fuel cell. The MEA is locally heated from below freezing to a suitable operating temperature by the exothermal chemical reaction between $H_2$ and $O_2$ on the anode and/or cathode catalysts. To their end, $H_2$ is introduced into the $O_2$-rich cathode feed stream and/or $O_2$ is introduced into the $H_2$-rich anode feed stream.

12 Claims, 1 Drawing Sheet

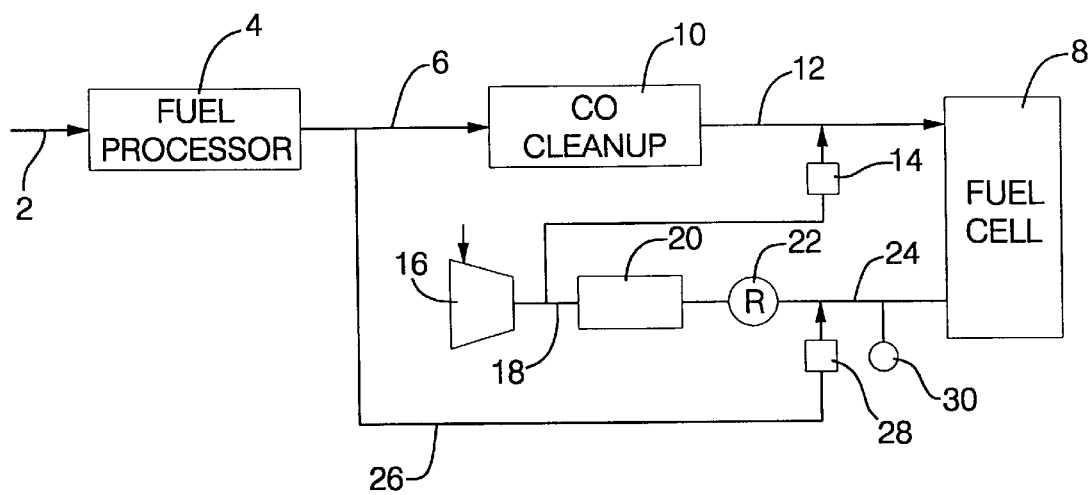

COLD START-UP OF A PEM FUEL CELL

This is a Continuation-In-Part application of Ser. No. 09/470,366 filed on Dec. 22, 1999 now abandoned.

TECHNICAL FIELD

This invention relates to PEM/SPE fuel cells, and more particularly, to a method of starting-up such fuel cells from subfreezing temperatures.

BACKGROUND OF THE INVENTION

Fuel cells have been proposed as a power source for many applications. So-called PEM (proton exchange membrane) fuel cells [a.k.a. SPE (solid polymer electrolyte) fuel cells] are particularly desirable for both mobile (e.g. electric vehicles) and stationary applications. PEM/SPE fuel cells include a "membrane electrode assembly" (hereafter. MEA) comprising a thin proton-conductive (i.e. $H^+$-conductive), solid-polymer, membrane-electrolyte having an anode on one of its faces and a cathode on the opposite face. The solid-polymer membranes are typically made from ion exchange resins such as perfluoronated sulfonic acid. One such resin is NAFION™ sold by the DuPont Company. Such membranes are well known in the art and are described in U.S. Pat. No. 5,272,017 and 3,134,697 as well as in the Journal of Power sources, Vol. 29, (1990), pages 367–387, inter alia. The anode and cathode typically comprise finely divided catalytic particles either alone or supported on the internal and external surfaces of carbon particles, and have proton conductive resin intermingled therewith. The anode and cathode catalysts cover opposite faces of a solid polymer membrane electrolyte.

The MEA is sandwiched between a pair of electrically conductive current collectors for the anode and cathode. The current collectors contain channels/grooves on the faces thereof defining a "flow field" for distributing the fuel cell's gaseous reactants (i.e. $H_2$ and $O_2$) over the surfaces of the respective anode and cathode catalysts. Hydrogen is the anode reactant (i.e. fuel) and can either be in a pure form or derived from the reformation of methanol, gasoline or the like. Oxygen is the cathode reactant (i.e. oxidant), and can be either in a pure form or diluted with nitrogen (e.g. air). The overall electrochemical reaction occurring at the MEA under normal fuel cell operation is: (1) $H_2$ is oxidized on the anode catalyst to form $2H^+$ ions and releases 2 electrons to the external circuit; (2) the $H^+$ ions move through the membrane to its cathode side; (3) the 2 electrons flow through the external circuit to the cathode side of the membrane where they reduce the $O_2$ on the cathode catalyst to form $O^-$ ions; and (4) The $O^-$ ions react with the $H^+$ ions on the cathode side of the membrane to form water.

It is desirable for many applications, and particularly electric vehicle applications (i.e. to meet customer expectations), that the fuel cell be capable of being started-up quickly so as to be immediately available to produce the energy needed to propel the vehicle without significant delay. At high ambient temperatures (e.g. about 20° C. or more), the fuel cell stack (i.e. plurality of individual cells bundled together into a high voltage pack) can be started-up in a reasonable amount of time because electrical current can be immediately drawn from the stack which, in turn, causes electrical IR-heating of the stack to quickly heat up the stack to its preferred operating temperature (i.e. about 80° C.). At subfreezing temperatures below about −25° C., however, rapid start-up is much more difficult, because at these temperatures the rate at which the overall electrochemical reaction occurring at the membrane-electrode-assembly takes place is significantly reduced thereby limiting the amount of current that can be drawn from the stack, and hence the IR-heating that can be inputted to the stack. The precise mechanism for the reaction rate reduction is not known. However, it is believed to be that either (1) the $H^+$ ion conductivity of the solid polymer membrane electrolytes is so poor at these temperatures, (2) or the effectiveness of the catalysts to electrochemically ionize the $H_2$ and/or $O_2$ is so poor at these temperatures, that no significant amount of electrical current can be drawn from the stack, and no corresponding IR-heating thereof can occur.

SUMMARY OF THE INVENTION

The present invention comprehends a method of heating the MEA of a PEM fuel cell while it is cold to thaw it out and thereby accelerate cold start-up of the fuel cell. The method applies to single cells as well as a stack of such cells. The fuel cell has a MEA that comprises a proton-conductive membrane, a cathode catalyst supported on a first face of the membrane, and an anode catalyst supported on a second face of the membrane opposite the first face. In accordance with the present invention, the MEA is thawed out by locally heating it using the heat generated by the exothermal chemical reaction between $H_2$ and $O_2$ on the anode and/or cathode catalyst(s) which raises the MEA's temperature from a first subfreezing temperature to a second temperature which is above the first temperature and which enhances the rate of the overall electrochemical reaction occurring at the MEA. More specifically, the method of the present invention comprises the steps of: (1) supplying a $H_2$-rich gas (e.g. pure $H_2$ or CO-containing reformate) to the anode catalyst and a $O_2$-rich gas (e.g. pure $O_2$ or air) to the cathode catalyst; (2) introducing a sufficient quantity of $H_2$ into the $O_2$-rich gas, and/or a sufficient quantity of $O_2$ into the $H_2$-rich gas to exothermally chemically react the $H_2$ with the $O_2$, and thereby assist in heating the MEA up to a second temperature where current can be drawn from the fuel cell; (3) discontinuing the introduction of such quantities of $H_2$ and/or $O_2$ after the MEA reaches a suitable temperature at or above the second temperature; and (4) drawing electrical current from the fuel cell to assist in completing the heating of the fuel cell up to its normal operating temperature.

The $H_2$-rich gas that fuels the anode may be the source of the $H_2$ provided to the $O_2$-rich cathode gas, and air may be the source of the $O_2$ provided to the $H_2$-rich gas. The amount of $H_2$ introduced into the $O_2$-rich gas is such as would produce a mix having a hydrogen content of about 0.5% to about 3.5% by volume. $O_2$ concentrations as low as about 1% and as high as 7% by volume (i.e. when mixed with the $H_2$-rich gas) can be used when pure $H_2$ is the fuel. When CO-containing $H_2$-rich gases (e.g. reformate) are used, $O_2$ concentrations between 2% and about 7% by volume are preferred.

The faces of the membrane that support the catalysts each has (1) a leading edge that first contacts the $O_2$-rich/$H_2$-rich gas (es), and (2) a trailing edge that last contacts $O_2$-rich/$H_2$-rich gases as the gas (es) flow over the appropriate cathode or anode face. During the thawing step of this invention, the $O_2$-rich and/or $H_2$-rich gases may be flowed across their associated MEA faces from the leading edge toward the trailing edge at a flow rate greater that than the flow rate used for the normal operation of the fuel cell once it has reached its normal operating temperature. This higher rate insures that much of the $O_2$ and/or $H_2$, as appropriate, is/are swept downstream of the leading edge to react on catalyst downstream of the leading edge so as to heat the MEA more evenly than would occur if the $O_2/H_2$ gas were flowed at a slower rate and mostly reacted near the leading edge. In this regard, slow flow rates tends to increase the residence time of the $O_2/H_2$ near the leading edge which causes more of the $O_2/H_2$ to react thereat causing uneven heating of the MEA. Hence by way of example, if the flow rate of $H_2$ through a given stack during normal operations were 0.01 kg/min., a useful flow rate during MEA thawing might be about 0.04 kg/min. Similarly, if the flow rate of $O_2$ through a given stack during normal operations were 0.16 kg/min., a useful flow rate during MEA thawing might be about 0.64 kg/min. Alternatively, the gas flow channels through which the $O_2$-rich and $H_2$-rich gases flow could be configured (e.g. tapered) such that the gas velocity therein changes from a first higher velocity at the leading edge to a second lower velocity downstream of the leading edge which will also serve to effect more even heating of the MEA.

If the fuel cell stack were shut down "wet" (i.e. with free water present), ice could form atop the catalyst(s) when the stack is subjected to freezing temperatures. Such ice could block access to the catalyst(s) by the $H_2$ and/or $O_2$ and prevent the desired chemical reaction from occurring. In the event of such icing, it is preferred to warm (i.e. above the temperature of the MEA) dry $H_2$-rich and/or $O_2$-rich gas(es) and pass it/them through the associated flow field(s) for a sufficient time to de-ice the catalyst(s) before introducing the $O_2$ and/or $H_2$ into the fuel or oxidant streams.

The present invention will better be understood when considered in the light of the following detailed description of one embodiment thereof which is given hereafter in conjunction with the Figure in which:

BRIEF DESCRIPTION OF THE DRAWINGS

The FIGURE is a simplified schematic of a fuel cell system according to the present invention.

DESCRIPTION OF THE PREFERRED EMBODIMENT

The FIGURE depicts a simplified schematic of a fuel cell system in accordance with the present invention. In this embodiment, a fuel processor (e.g. reformer) is used to produce a CO-containing, $H_2$-rich fuel gas. Alternatively, the $H_2$-rich gas could be sourced from tanked $H_2$, adsorbed $H_2$ (e.g. on carbon), or chemically bound hydrogen (e.g. metal hydride). In the embodiment shown, a hydrogen-containing fuel (e.g. methanol, or gasoline) 2 is supplied to a fuel processor 4 (e.g. steam reformer or autothermal reactor) that catalytically dissociates the fuel into an $H_2$-rich reformate 6 comprising $H_2$, $CO_2$, $H_2O$ and CO. The CO content of the reformate 6 is usually too high for the fuel cell stack 8 to accommodate—so the reformate 6 passes one or more CO clean-up devices 10 which typically includes a water gas shift reactor and a preferential oxidation reactor, both of which are well known in the art and do not form a part of the present invention. After the CO content has been reduced to satisfactory levels, the reformate feed stream 12 is fed to the fuel cell stack 8. As a final CO-cleanup measure, a small amount of air (i.e. less than 8% by volume) is fed into the feed stream 12 via a metering device 14 at the entrance to the stack 8. The metering device 14 may comprise any one of a variety of devices such as a variable orifice injector, a pulse width modulated injector or a fixed-displacement type device so long as it is capable of modulating the flow of air. The air for the metering device 14 is provided by a compressor 16, and is heated therein incident to the heat of compression that is produced in the compressor 16. The compressor 16 also produces compressed air 18 for the cathode side of the fuel cell stack 8 which cathode air is humidified in a humidifier 20 positioned downstream of the compressor 16. A pressure regulator 22 insures that the air supplied to the fuel cell 8 is at an appropriate pressure.

In accordance with the present invention, sufficient $O_2$ (i.e. as air) is provided to the $H_2$-rich feed stream for the anode side of the stack 8 and/or sufficient $H_2$ supplied to the $O_2$-rich feed stream for the cathode side of the stack 8 when the stack is at a temperature below about $-25°$ C. to heat-up the MEA(s) in the stack to a temperature of at least about $-20°$ C., at which latter temperature electrical current can be drawn from the stack and internal IR heating of the stack begun. Thermal start-up of the stack 8 can further be effected by heating the coolant (e.g. with a combuster) that normally circulates through the stack 8 to cool it. Once the stack 8 is up to temperature, heating of the stack coolant is discontinued, and it resumes its normal cooling function. Preferably, the $O_2$ and/or $H_2$ used for heating/thawing will continue to flow until the stack has reached a temperature of at least about $0°$ C. to supplement the IR-heating below freezing.

The $O_2$ (e.g. as air) can conveniently be supplied to the anode side of the stack 8 via the same metering device 14 that is used for supplying air for the final CO clean-up, supra, during normal operation of the stack. However, for the exothermic heating purpose of the present invention, the $O_2$ will be supplied to the anode side at a rate sufficient to yield a feed stream having an $O_2$ content of at least 2% by volume and less than about 7% by volume. Once the temperature of the MEA is raised sufficiently (i.e. to above about $0°$ C.), the $O_2$ flow rate is reduced down to the desired CO-cleanup level (i.e. less than 1.6% by volume). Similarly, the $H_2$ is supplied to the air stream 24 to the stack 8 via line 26 and metering device 28. The $H_2$ will be supplied to the cathode side of the stack 8 at a rate sufficient to yield an air stream 24 having an $H_2$ content of at least about 0.5% by volume and less than about 3.5% by volume. A $H_2$ sensor 30 monitors the $H_2$ concentration in the air stream 24, and can be coupled to appropriate devices for controlling the $H_2$ flow rate.

Because of the cold temperatures, little if any reaction occurs between the $H_2$ and $O_2$ until the gas streams are contacted by the catalysts that form the anode and cathode faces of the membrane. When such contact is made, an exothermic reaction occurs and the heat therefrom is transmitted directly into the MEA. If the stack was shutdown "wet", some ice may form over the catalyst(s) when the stack is frozen. Such ice formation can inhibit contact between the catalysts and the $H_2$—$O_2$, but can readily be removed by heating the feed stream 12 and air stream 24 and flowing them over the catalyst to melt the ice and carry away the water formed before admitting the $O_2$ and $H_2$ to their appropriate streams.

While the invention has been described in terms of specific embodiments thereof, it is not intended to be limited thereto but rather only to the extent set forth hereafter in the claims which follow.

What is claimed is:

1. A method of heating a membrane electrode assembly of a PEM fuel cell from a first subfreezing temperature to a second temperature above said first temperature that enhances the rate of the overall electrochemical reaction occurring at the membrane-electrode-assembly, said fuel cell having a membrane-electrode-assembly comprising a proton-conductive membrane, a cathode catalyst supported on a first face of said membrane, and an anode catalyst supported on a second face of said membrane opposite said first face, comprising the steps of:

a) supplying a $H_2$-rich gas to said anode catalyst at a temperature greater than said first temperature;

b) supplying an $O_2$-rich gas to said cathode catalyst; and c) introducing sufficient $H_2$ into said $O_2$-rich gas to exothermally chemically react said $H_2$ with said $O_2$-rich gas on said cathode catalyst to heat said membrane-electrode-assembly to said second temperature.

2. The method according to claim 1 including the additional step of introducing sufficient $O_2$-rich gas into said $H_2$-rich gas to exothermally chemically react said $O_2$ with said $H_2$-rich gas on said anode catalyst so as to further heat said membrane-electrode-assembly to said second temperature.

3. A method of heating membrane-electrode-assembly of a PEM fuel cell from a first subfreezing temperature to a second temperature above said first temperature that enhances the rate of the overall electrochemical reaction occurring at the membrane-electrode-assembly, said fuel cell having a membrane-electrode-assembly comprising a proton-conductive membrane, a cathode catalyst supported on a first face of said membrane, and an anode catalyst supported on a second face of said membrane opposite said first face, comprising the steps of:

a) supplying a CO-free, $H_2$-rich gas to said anode catalyst at a temperature greater than said first temperature;

b) supplying an $O_2$-rich gas to said cathode catalyst; and c) introducing sufficient $O_2$ into said CO-free, $H_2$-rich gas to exothermally chemically react with sufficient $H_2$ in said $H_2$-rich gas on said anode catalyst to heat said membrane-electrode-assembly to said second temperature.

4. A method of heating a membrane-electrode-assembly of a PEM fuel cell from a first subfreezing temperature to a second temperature above said first temperature that enhances the rate of the overall electrochemical reaction occurring at the membrane-electrode-assembly, said fuel cell having a membrane-electrode-assembly comprising a proton-conductive membrane, a cathode catalyst supported on a first face of said membrane, and an anode catalyst supported on a second face of said membrane opposite said first face, comprising the steps of:

a) supplying a CO-containing, $H_2$-rich gas to said anode catalyst;

b) supplying an $O_2$-rich gas to said cathode catalyst; and c) introducing about 2% to about 7% by volume $O_2$ into said CO-containing, $H_2$-rich gas to exothermally chemically react with sufficient $H_2$ in said $H_2$-rich gas on said anode catalyst to heat said membrane-electrode-assembly to said second temperature.

5. The method according to claim 4 wherein said $H_2$-rich gas is supplied at a temperature that is above said first temperature.

6. The method according to claim 4 wherein said $O_2$-rich gas is supplied at a temperature that is above said first temperature.

7. A method of heating a membrane electrode assembly of a PEM fuel cell from a first subfreezing temperature to a second temperature above said first temperature that enhances the rate of the overall electrochemical reaction occurring at the membrane-electrode-assembly, said fuel cell having a membrane-electrode-assembly comprising a proton-conductive membrane, a cathode catalyst supported on a first face of said membrane, and an anode catalyst supported on a second face of said membrane opposite said first face, comprising the steps of:

a) supplying a $H_2$-rich gas to said anode catalyst;

b) supplying an $O_2$-rich gas to said cathode catalyst at a temperature greater than said first temperature; and c) introducing sufficient $H_2$ into said $O_2$-rich gas to exothermally chemically react said $H_2$ with said $O_2$-rich gas on said cathode catalyst to heat said membrane-electrode-assembly to said second temperature.

8. A method of heating a membrane-electrode-assembly of a PEM fuel cell from a first subfreezing temperature to a second temperature above said first temperature that enhances the rate of the overall electrochemical reaction occurring at the membrane-electrode-assembly, said fuel cell having a membrane-electrode-assembly comprising a proton-conductive membrane, a cathode catalyst supported on a first face of said membrane, and an anode catalyst supported on a second face of said membrane opposite said first face, comprising the steps of:

a) supplying a CO-free, $H_2$-rich gas to said anode catalyst;

b) supplying an $O_2$-rich gas to said cathode catalyst at a temperature greater than said first temperature; and c) introducing sufficient $O_2$ into said CO-free, $H_2$-rich gas to exothermally chemically react with sufficient $H_2$ in said $H_2$rich gas on said anode catalyst to heat said membrane-electrode-assembly to said second temperature.

9. A method of heating a membrane electrode assembly of a PEM fuel cell from a first subfreezing temperature to a second temperature above said first temperature that enhances the rate of the overall electrochemical reaction occurring at the membrane-electrode-assembly, said fuel cell having a membrane-electrode-assembly comprising a proton-conductive membrane, a cathode catalyst supported on a first face of said membrane that has a leading and trailing edge, and an anode catalyst supported on a second face of said membrane opposite said first face, comprising the steps of:

a) supplying a $H_2$-rich gas to said anode catalyst;

b) supplying an $O_2$-rich gas to said cathode catalyst;

c) introducing sufficient $H_2$ into said $O_2$-rich gas to exothermally chemically react said $H_2$ with said $O_2$-rich gas on said cathode catalyst to heat said membrane-electrode-assembly to said second temperature; and d) flowing said $O_2$-rich gas across said first face from said leading edge toward said trailing edge at a first rate during normal operation of said fuel cell and at a second rate greater than said first rate during chemical heating of the membrane-electrode-assembly, whereby more of said $O_2$-rich gas is swept downstream of said leading edge to react on cathode catalyst downstream of said leading edge and thereby heat said membrane more evenly than if the $O_2$-rich gas were flowed at said first rate.

10. A method of heating a membrane electrode assembly of a PEM fuel cell from a first subfreezing temperature to a second temperature above said first temperature that enhances the rate of the overall electrochemical reaction occurring at the membrane-electrode-assembly, said fuel cell having a membrane-electrode-assembly comprising a proton-conductive membrane, a cathode catalyst supported on a first face of said membrane that has a leading edge and a trailing edge, and an anode catalyst supported on a second face of said membrane opposite said first face, comprising the steps of:

a) supplying a $H_2$-rich gas to said anode catalyst;

b) supplying an $O_2$-rich gas to said cathode catalyst;

c) introducing sufficient $H_2$ into said $O_2$-rich gas to exothermally chemically react said $H_2$ with aid $O_2$-rich gas on said cathode catalyst to heat said membrane-electrode-assembly to said second temperature; and d) flowing said $O_2$-rich gas over said first face from said leading edge toward said trailing edge at a rate that varies from a first velocity at said leading edge to a second velocity at said trailing edge that is less than said first velocity to heat said membrane substantially evenly.

11. A method of heating a membrane electrode assembly of a PEM fuel cell from a first subfreezing temperature to a second temperature above said first temperature that enhances the rate of the overall electrochemical reaction occurring at the membrane-electrode-assembly, said fuel cell having a membrane-electrode-assembly comprising a proton-conductive membrane, a cathode catalyst supported on a first face of said membrane, and an anode catalyst supported on a second face of said membrane opposite said first face, comprising the steps of:

a) supplying a $H_2$-rich gas to said anode catalyst;

b) supplying an $O_2$-rich gas to said cathode catalyst;

c) introducing sufficient $H_2$ into said $O_2$-rich gas to exothermally chemically react said $H_2$ with said $O_2$-rich gas on said cathode catalyst to heat said membrane-electrode-assembly to said second temperature; and d) supplying said $O_2$-rich gas to said cathode catalyst for a sufficient period of time before introducing said $H_2$ into said $O_2$-rich gas to remove any ice from the surface of said cathode catalyst that might otherwise impede the $H_2$-$O_2$ chemical reaction that is to occur in said cathode catalyst.

12. A method of heating membrane-electrode-assembly of a PEM fuel cell from a first subfreezing temperature to a second temperature above said first temperature that enhances the rate of the overall electrochemical reaction occurring at the membrane-electrode-assembly, said fuel cell having a membrane-electrode-assembly comprising a proton-conductive membrane, a cathode catalyst supported on a first face of said membrane, and an anode catalyst supported on a second face of said membrane opposite said first face, comprising the steps of:

a) supply a CO-free, $H_2$-rich gas to said anode catalyst;

b) supplying an $O_2$-rich gas to said cathode catalyst;

c) introducing sufficient $O_2$ into said CO-free, $H_2$-rich gas to exothermally chemically react with sufficient $H_2$ in said $H_2$-rich gas on said anode catalyst to heat said membrane-electrode-assembly to said second temperature; and d) supplying said $H_2$-rich gas to said anode catalyst for a sufficient period of time before the introduction of said $O_2$ to remove any ice from the surface of said anode catalyst that might otherwise impede the $H_2$—$O_2$ chemical reaction that is to occur on said anode catalyst.

* * * * *